G. POLLARD.
REVERSING GEARING.
APPLICATION FILED MAR. 20, 1916.

1,293,190.

Patented Feb. 4, 1919.
2 SHEETS—SHEET 1.

UNITED STATES PATENT OFFICE.

GEORGE POLLARD, OF LONDON, ENGLAND, ASSIGNOR TO THE MENCO-ELMA SYNDICATE LIMITED, OF LONDON, ENGLAND.

REVERSING-GEARING.

1,293,190.  Specification of Letters Patent.  Patented Feb. 4, 1919.

Application filed March 20, 1916. Serial No. 85,409.

*To all whom it may concern:*

Be it known that I, GEORGE POLLARD, a subject of the King of England, residing at London, England, have invented certain new and useful Improvements in Reversing-Gearing, of which the following is a specification.

This invention is for improvements in or relating to power-transmission systems and has for its object to provide an improved construction of gearing which will give forward and reverse drives at the same speed or approximately so, being controlled by electro-magnetic clutches. Gearing of this type is particularly suitable for use in motor-boats, but it will be appreciated that it may be equally well applied to various other purposes, and can be used in automobiles, between the engine and the driven road-wheels.

According to the present invention there is provided in power-transmission systems, the combination with co-axial driving and driven shafts, of a casing or gear-wheel carrier mounted concentrically with them, gearing carried by said casing and shafts coupling them so that the shafts turn in opposite directions at the same speed or approximately so when the casing is held stationary, an electro-magnetic clutch to couple the casing to the driving-shaft to prevent the gears from rolling on one another, and a stationary electro-magnetic brake which alternatively will hold the casing so that the gears will roll on one another.

In a preferred construction, the gearing comprises a casing, one or more pairs of counter-shafts carried by the casing and parallel to the driving and driven shafts, a gear-wheel on each counter-shaft of a pair meshing with a gear-wheel on the other, and a second gear-wheel on each of the counter-shafts coupled to the first and meshing respectively with gear-wheels on the driving and driven shafts.

The gear-casing or carrier preferably has a magnetic armature secured on it, and an electro-magnet rotating with either the driving or driven shaft is used to lock the casing thereto: the stationary electro-magnet which holds the casing may be operative on the same or another armature also secured on the casing.

In the accompanying drawings:—

Like reference characters indicate like parts throughout the drawings.

Figure 1:
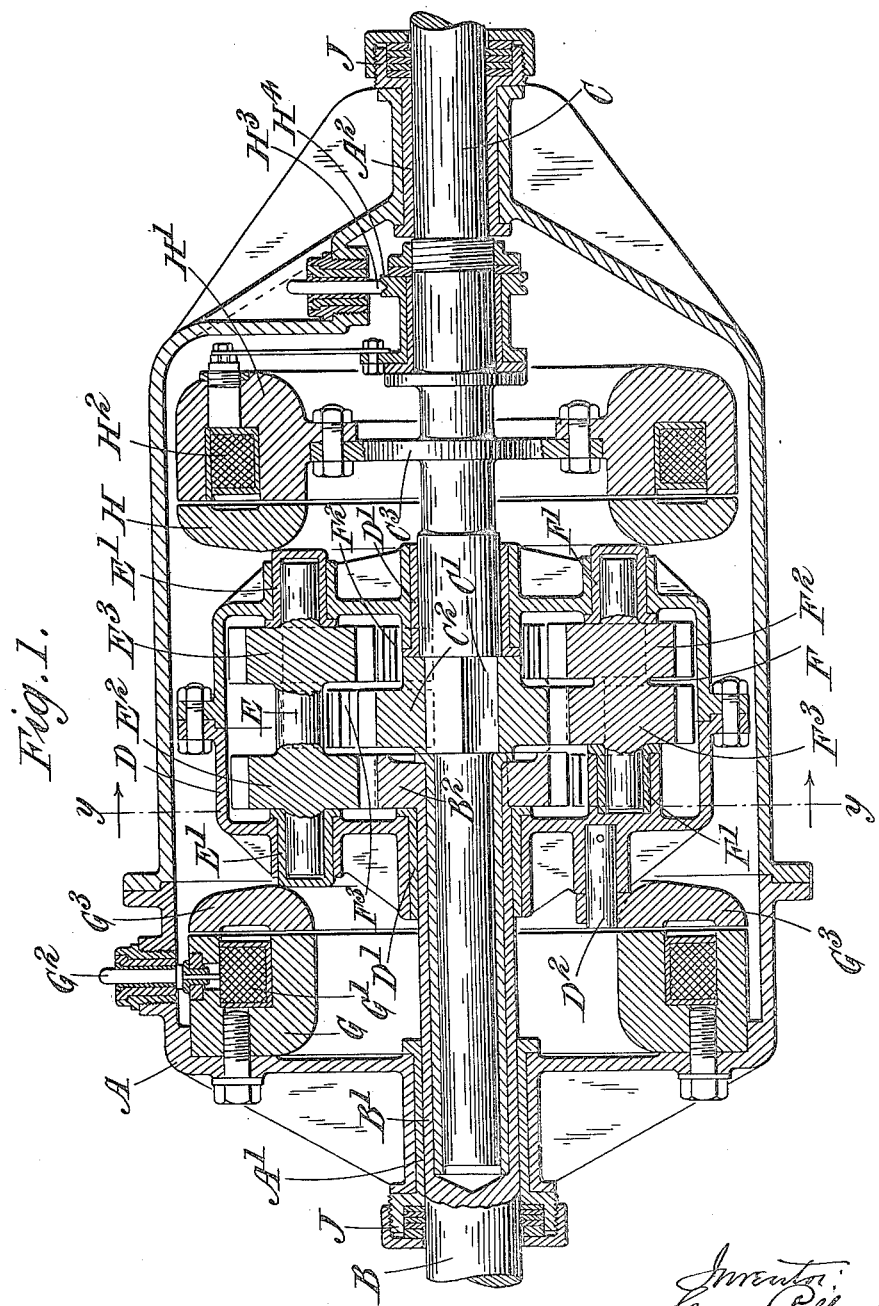
Figure 1 is a longitudinal section of a construction using spur-gears, being a section on the line $x$—$x$ of Fig. 2.
Figure 2:
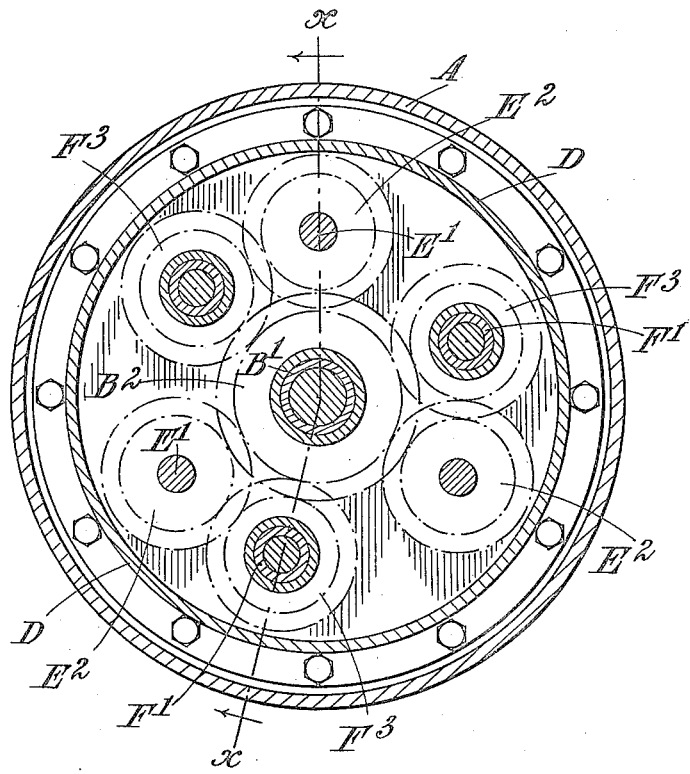
Fig. 2 is a section on the line $y$—$y$ of Fig. 1.

Referring first to Figs. 1 and 2, a fixed casing A is provided with bearings $A^1$, $A^2$ which receive the driving shaft B and the driven shaft C respectively. These shafts are co-axial with one another and the end of the driven shaft C is rotatable in a bearing $B^1$ in the end of the driving shaft B. The shaft B carries at its end a spur-wheel $B^2$ mounted to rotate with it. The shaft C is formed with a square or octagonal portion $C^1$ upon which is mounted a spur-wheel $C^2$ of the same size as the spur-wheel $B^2$, and situated beside it.

A gear-carrier constituted by the casing D is rotatably mounted on the two shafts B, C, by means of bearings $D^1$, and this casing carries one or more pairs of counter-shafts, as shown in Fig. 2; three pairs of such counter-shafts E, F, are used in order to give a balanced structure. These counter-shafts are mounted in bearings $E^1$, $F^1$ respectively, and the bearings are preferably formed with closed ends, as shown at $E^1$, although some of them, as shown at $F^1$, need not be so formed.

The counter-shaft E carries two gear-wheels $E^2$, $E^3$, which are rotatably coupled together. This may be obtained by forming them integral with the counter-shaft itself, or they may be each secured to it, or yet again they may be coupled together and loose on the shaft. The shaft F is similarly provided with two wheels $F^2$, $F^3$. The wheel $E^2$ meshes with the spur-wheel $B^2$ on the driving-shaft, the wheel $E^3$ meshes with the wheel $F^2$ on the shaft F, and the wheel $F^3$ meshes with the wheel $C^2$ on the driven shaft.

The stationary casing A carries an electromagnet G fixed on it, and having a coil $G^1$ to which the current is supplied through any suitable form of connection $G^2$. The armature $G^3$ for this magnet is mounted on the rotatable casing D by means of pins $D^2$, as shown in Fig. 1, this arrangement providing for movement of the armature toward or away from the electro-magnet if desired.

A similar armature H is secured on the other end of the gear casing D, and it is used to coöperate with an electro-magnet H¹. This magnet H¹ is mounted on a disk C³ which is secured to or formed integral with the shaft C so that the magnet H¹ is carried around with it. Current is supplied to the coil H² of the magnet H¹ by a rubbing contact H³ which is arranged to coöperate with a contact H⁴, this ring H⁴ being preferably of as small a diameter as convenient.

The whole gear may be immersed in oil if desired, and a suitable packing J should then be provided on each of the shafts B, C, as shown in Fig. 1.

The gear-wheels B², C², as above described are of the same size, and preferably also the wheels E², E³, F², F³ are also of the same size, so that in operation this gearing gives a reverse drive, having a gear ratio of 1:1. The forward drive is obtained by energizing the coil H² of the magnet H¹; the armature H with the gear-carrying casing D is thereby locked to the magnet H¹ and the shaft C so as to rotate solid with it. The various gear-wheels therefore cannot rotate relatively to one another and the drive is transmitted from the driving-shaft B through the gear-wheel B² to the casing which it carries around solid with it. The driven-shaft C is therefore also carried around at the same speed and in the same direction as the driving-shaft.

In order to obtain the reverse drive, the magnet H¹ is deënergized and the magnet G energized instead. The armature G³ is therefore held stationary and with it the casing D. The gears therefore can all rotate, so that the wheel B² drives the wheel E², the wheel E³ drives the wheel F², and the wheel F³ drives the wheel C² on the driven shaft in the opposite direction to the direction of rotation of the driven shaft. Since the gear-wheels are all of the same size, the ratio of transmission is 1:1.

Various modifications may be made in the construction of this gear; thus for example, instead of using two separate armatures G³ and H secured on the casing D, a single armature may be provided and the rotating and stationary electro-magnets may both be arranged to act on the one armature. This armature might be conveniently mounted around the casing D at the middle of its length, if the overall diameter of the gearing does not need to be restricted for other reasons.

Figure 3:
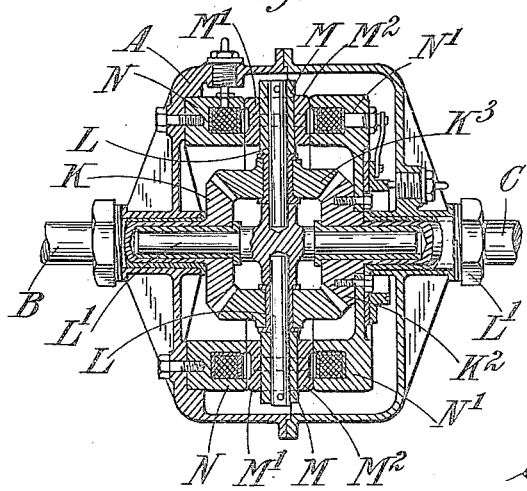
Fig. 3 is a diagrammatic representation of a construction of this invention using bevel-gears.

Fig. 3 shows diagrammatically an alternative construction of gearing in which bevel-wheels are used instead of spur-wheels. The driving-shaft B and the driven-shaft C are mounted in bearings in the fixed casing A. The two shafts B, C, carry bevel-wheels K¹, K² respectively, which mesh with bevel pinions K³ mounted to rotate on radial shafts L. These shafts L may be carried by a short shaft L¹ supported in bearings in the ends of the two shafts B, C. The outer ends of all the shafts L are connected by an annular member M which carries two magnetic armatures M¹, M². A stationary magnet N on the casing A is so situated as to operate on the armature M¹, and a second electro-magnet N¹ is mounted to rotate with the driven shaft C and so positioned as to operate on the armature M². When the electro-magnet N is energized, the shafts L for the bevel-gears K³ are held stationary and the gearing therefore operates to drive the shaft C in the opposite direction to that in which the shaft B rotates, and if the wheels K¹ K² are the same size, the ratio of transmission is 1:1. When the magnet N¹ is energized, the whole gearing is carried around solid with the driving and driven shafts for the forward drive.

The embodiment of the invention last described is not specifically claimed herein but forms the subject matter of a divisional application, filed August 25th, 1917.

This drawing is merely diagrammatic and many modifications may be made in the details of construction without departing from the spirit of the invention as set forth in the appended claims.

What I claim as my invention and desire to secure by Letters Patent is:—

1. In a power transmission system, the combination of a driving shaft, a driven shaft in alinement with the driving shaft, two duplicate gears, having the same diameters and number of teeth, secured respectively to the driving and driven shafts, a casing mounted to rotate coaxially with said shafts, duplicate gears carried by the casing and interconnected with each other and with the gears on the driving and driven shafts, said casing gears being adapted to move bodily with the casing or to rotate about axes parallel with the driving and driven shafts, a stationary electromagnet adapted to coöperate with the casing to act as a brake, and a second electromagnet fixed to one of the shafts to coöperate with the casing to act as a clutch, for the purpose described.

2. The combination of an engine or driving shaft, a propeller or driven shaft in alinement with the driving shaft, two gears secured respectively to said shafts, a casing mounted coaxially with the shafts, two pair of rigidly connected gears carried by the casing, one of each of said pairs meshing with one of the gears on the driving and driven shafts, and the other members of said pairs meshing with each other, said casing gears adapted to rotate about independent axes parallel to said shafts, all of said gears being of the same diameter and having an equal number of teeth, a stationary electromagnet adapted to coöperate with the casing to act as a brake, and an electromagnet fixed to one of the shafts to coöperate with the casing to act as a clutch, for the purpose described.

3. The combination of alined driving and driven shafts, the end of one of said shafts being hollowed to form a bearing for the other shaft, duplicate gears, having the same diameter and number of teeth, secured, respectively, to the driving and driven shafts, a casing mounted on said shafts and provided with two armatures, connections between the casing and the gears on the shafts including gears adapted to move bodily with the casing or to rotate about independent axes, said casing gears being duplicates of the shaft gears, a stationary electromagnet adapted to coöperate with one of the armatures on the casing, and an electromagnet mounted on one of the shafts and adapted to coöperate with the other armature on the casing, for the purpose described.

In testimony whereof I have signed my name to this specification in the presence of two subscribing witnesses.

GEORGE POLLARD.

Witnesses:
W. W. ANDERSON,
R. BOWYER.